United States Patent [19]
Morrison et al.

[11] Patent Number: 5,072,886
[45] Date of Patent: Dec. 17, 1991

[54] METHOD OF PREPARING A NEW ULTRA-FINE PARTICLE TRANSITION ALUMINA

[75] Inventors: S. Roy Morrison, Burnaby; Bijan K. Miremadi, Coquitlam, both of Canada

[73] Assignee: Simon Fraser University, Burnaby

[21] Appl. No.: 449,492

[22] Filed: Nov. 30, 1989

Related U.S. Application Data

[63] Continuation of Ser. No. 242,963, Sep. 9, 1988, abandoned.

[51] Int. Cl.$^5$ .............................................. B02C 19/12
[52] U.S. Cl. ........................................ 241/1; 241/15; 241/22
[58] Field of Search .................... 241/1, 15, 18, 21, 22, 241/30

[56] References Cited

U.S. PATENT DOCUMENTS

| | | | |
|---|---|---|---|
| 3,358,937 | 12/1967 | Pearson et al. | 241/15 |
| 3,881,661 | 5/1975 | Powers et al. | 241/30 X |
| 4,316,583 | 2/1982 | Kawano et al. | 241/1 |
| 4,600,154 | 7/1986 | Hirota et al. | 241/1 |

FOREIGN PATENT DOCUMENTS

| | | | |
|---|---|---|---|
| 11048 | 1/1983 | Japan | 241/22 |
| 219377 | 12/1984 | Japan | 241/1 |

OTHER PUBLICATIONS

Co-pending application Ser. No. 855,065, filed Apr. 23, 1986, now continuation-in-part application Ser. No. 015,920, filed Feb. 18, 1987.

*Primary Examiner*—Joseph M. Gorski
*Attorney, Agent, or Firm*—Barrigar & Oyen

[57] ABSTRACT

A novel method of preparing a new transition alumina fractured into ultra-fine particles which have utility inter alia as catalysts. The method of preparing this new alumina fractured into ultra-fine particles comprises: (a) introducing an alkali metal into the pores of a porous alumina, and (b) immersing the alkali metal-treated alumina in water whereupon hydrogen gas is generated and fractures the alumina into ultra-fine particles.

12 Claims, 8 Drawing Sheets

METHOD OF PREPARING A NEW ULTRA-FINE PARTICLE TRANSITION ALUMINA

This application is a continuation of application Ser. No. 07/242,963, filed on Sept. 9, 1988 abandoned.

FIELD OF THE INVENTION

This invention pertains to a novel method of preparing new transition alumina fractured into ultra-fine particles which have utility inter alia as catalysts.

BACKGROUND OF THE INVENTION

In preparation of an exfoliated $MoS_2$ catalyst, supported on alumina particles of 300 Angstroms in diameter (Alon Gama-Alumina), an increase in methanation activity by a factor of 4 was achieved by the inventors, and others, as compared to the commercial catalyst (Harshaw 500 E). Co-pending application Ser. No. 855,065, filed Apr. 23, 1986, discloses this subject matter. In general, in order to deposit $MoS_2$ on the alumina support, the exfoliation technique was used to separate the layers of the layered compound $MoS_2$ into single layers in suspension. Then by selection of a proper promoter, the $MoS_2$ single layers and the promoter ions together were deposited onto the alumina support.

Exfoliation, of course, occurs only with layer compounds such as $MoS_2$, $WS_2$, $TiS_2$, etc., for it requires a high density of material such as lithium to intercalate between the layers, a process not possible with non-layered materials such as alumina.

It was during the deposition of the exfoliated $MoS_2$ onto a porous chi-alumina support that we discovered another process by which the porous chialumina was apparently converted to a new transition alumina and then fractured into ultra-fine particles. The attempt was made, at the beginning, to use this coarse but porous (8 nanometers in pore size) chialumina under the same preparation conditions as it was used for 300 Angstroms Alon alumina, but it was found that the single layers of $MoS_2$ simply coated the outside surface of the porous alumina particles and did not penetrate into the pores. Thus, the pores were blocked, the extra area available from the pores was lost, and the catalyst was effectively "dead". This interpretation was supported by $CO_2$ absorption measurements which indicated that the exposed area of the $Al_2O_3$ decreased from 286 $m^2/g$ to 32 $m^2/g$ when exfoliated $MoS_2$ was deposited.

SUMMARY OF THE INVENTION

The present invention relates to a method of preparing a new transition alumina fractured into ultra-fine particles comprising: (a) introducing an alkali metal into the pores of the alumina, and (b) immersing the alkali metal-treated alumina in water so that the generated hydrogen gas fractures the alumina into fine particles.

In the method as described, the alkali metal can be lithium. The lithium can be contained in a lithium organic vehicle such as n-butyllithium in hexane. It can also be present as molten lithium metal or lithium vapour.

In the process as defined, the lithium introduction is carried out in an inert environment. In the method as defined, the alumina can be subjected to vigorous agitation during the alkali metal introduction step. In the method as defined, the alumina can be subjected to ultra-sonic agitation during the alkali metal introduction step. In the methods as defined, the alumina can be subjected to the molten lithium metal, and, in the methods as defined, the alumina can be subjected to the lithium vapour. The invention includes preparation of a new transition alumina. The invention also includes fractured porous alumina prepared by the process of the invention.

BRIEF DESCRIPTION OF THE DRAWINGS

In drawings which illustrate specific embodiments of the invention but which should not be construed as restricting the spirit or scope of the invention in any way.

DETAILED DESCRIPTION OF SPECIFIC EMBODIMENTS OF THE INVENTION

The inventors have attempted numerous approaches in an effort to make a good catalyst out of Alcan alumina (Alcan AA-101). These approaches were generally not successful. However, one variation was to soak the alumina powder and $MoS_2$ powder n-butyllithium, together or separately, and then immersing the two powders simultaneously in water. This treatment was found to provide an excellent catalyst with a 60-80 times higher activity than the commercial catalyst.

In trying to understand the underlying reasons for the exceptionally good catalytic activity of 60-80 times higher, we conclude that the alumina must have been fractured into small particles thereby greatly increasing the surface area. We have concluded that the lithium must have penetrated the pores of the porous chi-alumina and converted it to a new type transition alumina and, in generating hydrogen upon reaction with water, must have generated sufficient force to fracture the new alumina. To confirm this, we measured the surface area of the fractured alumina by $CO_2$ absorption, and found that the surface area was about 350 $m^2/g$, indicating either that the pores were unblocked or, more likely, that the surface area was increased. The latter suggests fracturing of the alumina. Assuming broken-up alumina was the cause of the improved catalysts and increased surface area, it follows that the alumina must have been broken into very fine particles of 50 to 100 Angstroms in diameter.

Figure 5:
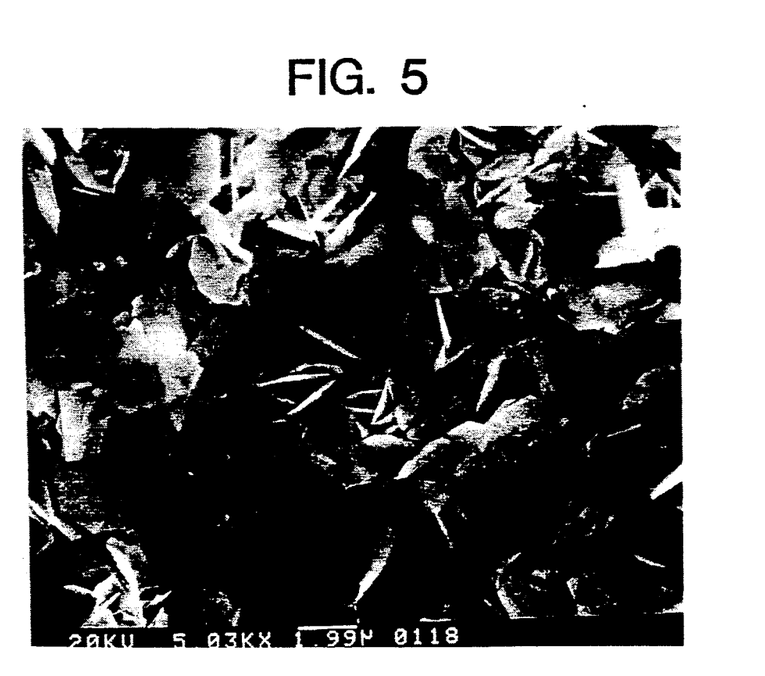
FIG. 5 illustrates a photomicrograph (SEM) of new transition alumina fractured into ultra-fine particles prepared according to the invention.
Figure 6:
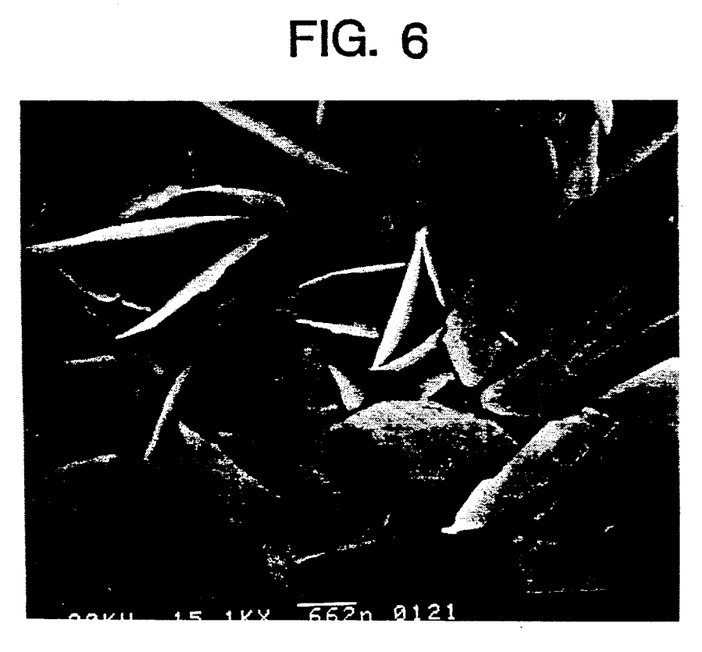
FIG. 6 illustrates an enlarged view of the new transition treated alumina fractured into ultra-fine particles as described in FIG. 5.

By introducing lithium into porous alumina and then putting the material in water, we have discovered that the porous alumina is transferred to a new form of tran- sition alumina and fractured into ultra-fine alumina particles. The lithium is introduced into the alumina pores by surface diffusion from a metal organic such as n-butyllithium or from molten lithium metal or from lithium vapour. The effect, when using n-butyllithium or lithium metal as the source, is enhanced substantially by an ultrasonic treatment during the lithiating step. The effect, when using molten lithium metal or lithium vapor as the source, is substantially enhanced further, as we find by comparing their related X-ray patterns and (SEM) micrographs. While we do not wish to be unduly bound by any theories, it seems that the lithiation of porous alumina produces a new transition alumina of hexagonal symmetry as is seen in FIGS. 5 and 6, possibly by a reaction such as $$Li + Al_2O_3 \cdot 2H_2O \rightarrow 2AlOOH + LiOH + \tfrac{1}{2}H_2$$

the $\tfrac{1}{2}H_2$ is catalized and produces lithiated $Al_2O_3$ and $H_2O$ gas molecules by the reaction $$2Li + \tfrac{1}{2}H_2 + 2AlOOH \rightarrow Li.Al_2O_3 + H_2O + LiH$$

then the reaction between excess Li metal in this lithiated alumina and the water generates hydrogen gas within the alumina and the alumina is fractured into ultrafine particles by the generated gas pressure.

$$Li.Al_2O_3 + H_2O \rightarrow LiOH + Al_2O_3 + \tfrac{1}{2}H_2$$

The fractured alumina particles appear in a SEM photo micrograph as thin platelets with a very high surface area, judging from the catalytic activity and the $CO_2$ adsorption. From the catalytic activity, one would estimate the thickness of the platelets to be of the order of substantially less than 100 Angstroms. Scanning electron micrographs (SEM) indicate a larger but poorly defined thickness for the particles but this may be an aberration due to electrostatic charging of the alumina during the SEM analysis and also due to the additional 100 Angstrom thick gold deposited on the platelets to minimize the charging effect.

It should be emphasized that it is not an easy task to disintegrate alumina into fine particles. Alumina is not a layer compound like $MoS_2$, for instance, so the lithium cannot be "intercalated" between the layers in order to affect separation. It appears from the results obtained that the lithium spontaneously converts it to a new transition alumina and in addition covers the surface of all of the pores of the alumina by surface diffusion. Then when this lithiated alumina is immersed in water, the generation of hydrogen within, forces the break-up of the alumina into fine platelets.

Process Technique

The basic technique used for preparing the new transition alumina by breaking up the porous alumina into fine particles is to lithiate the alumina first and then immerse it in water. In the preparation, which is described in more detail in the examples below, the alumina is added to a flask containing a hexane solution of n-butyllithium in a glove box and is held for about 2 days. In some cases, the flask, when stoppered, is taken out of the glove box for ultrasonic treatment. Because the flask is stoppered, the atmosphere (argon) over the liquid suspension remains inert to avoid premature reaction of the lithium with oxygen or water vapour. After a suitable time for lithiation (a maximum of 2 days or so), the flask (if removed) is returned to the glove box, the lithiated alumina is extracted and dried, and is placed again in a stoppered container for removal from the glove box. The contents of the flask are then immersed in water.

We assume, that, upon immersion in water, the reaction $$Li + H_2O \rightarrow LiOH + \tfrac{1}{2}H_2$$

occurs and that the hydrogen, when it is generated within this alumina, builds up sufficient pressure to break the alumina apart. We have found that the breaking of the alumina is enhanced by vigorous agitation, for example, with an ultrasonic bath.

We have also found that using molten lithium or lithium vapor at about 600° C. produce much finer alumina particles as confirmed by a longer settling time of the suspension. The objective of using this technique was to lower the cost of producing the ultra-fine alumina. We anticipate this will provide a lower cost process because the reduction of the resulting lithium to the metal is lower cost than is regenerating the lithium metal organic.

As mentioned previously, SEM micrographs of the particles show the formation of platelets. To describe this phenomenon, we use "thickness" rather than "diameter" as a descriptive measure of the surface area per unit mass.

Figure 1:
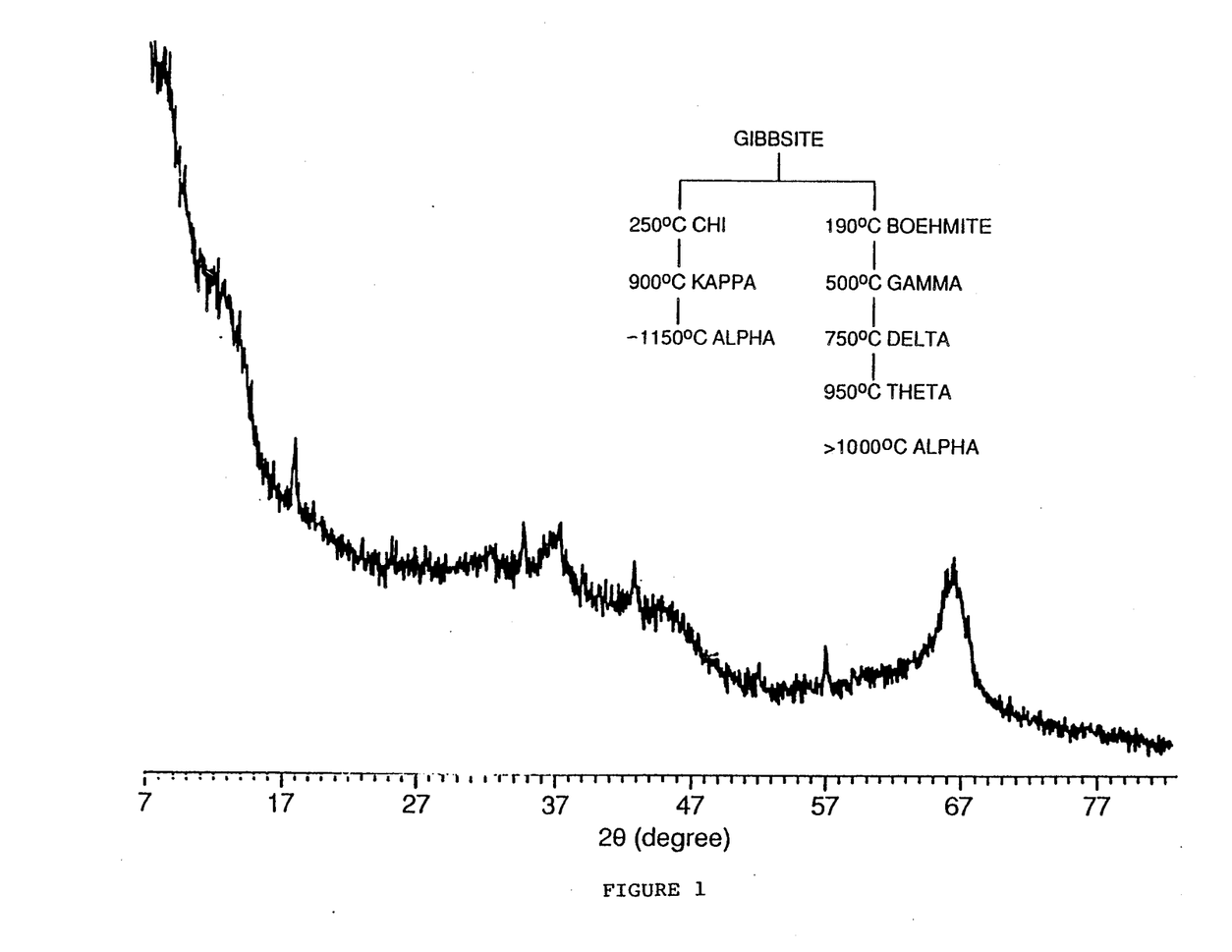
FIG. 1 illustrates an X-ray diffraction pattern of untreated porous alumina.

FIG. 1 illustrates an X-ray diffraction pattern of untreated porous alumina.

Figure 2:
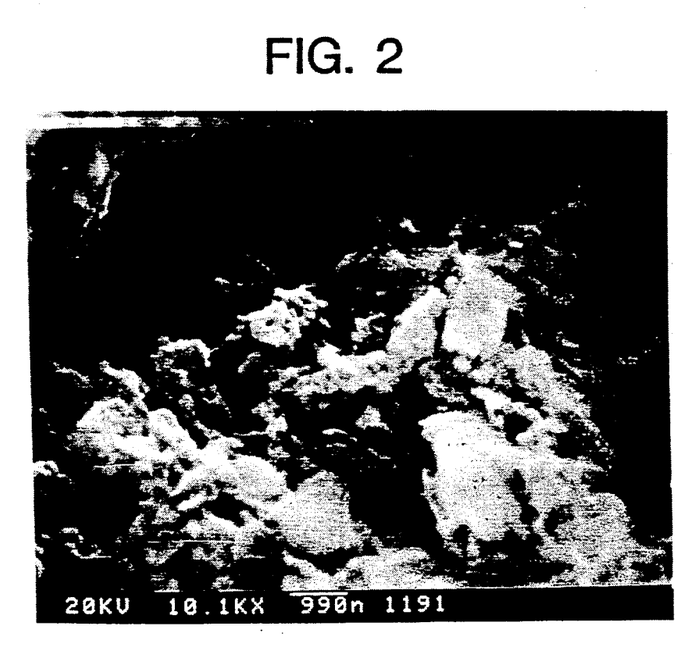
FIG. 2 illustrates a photomicrograph (SEM) of porous alumina in untreated form.

FIG. 2 shows a photomicrograph (scanning electron microscope, SEM) of the as-received Alcan AA-101 alumina, as obtained from Aluminum Company of Canada Limited.

Figure 3:
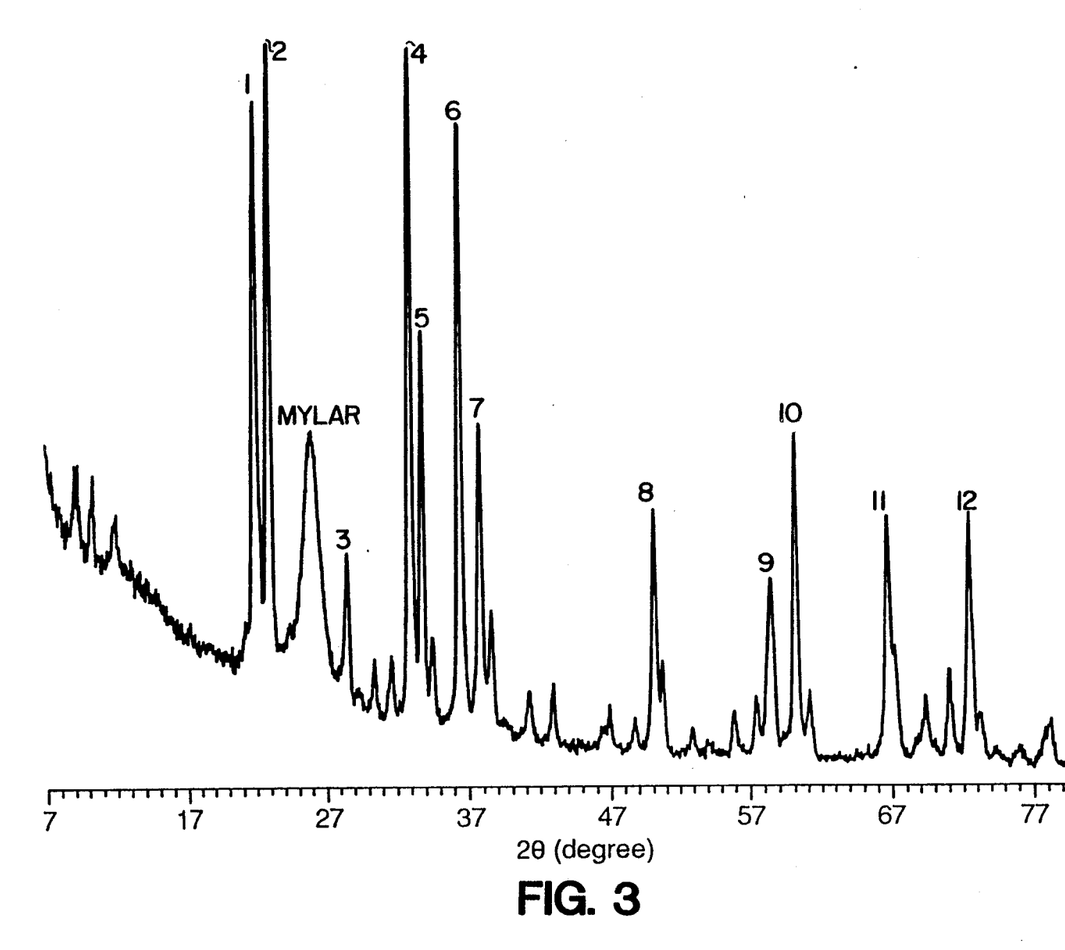
FIG. 3 illustrates an X-ray diffraction pattern of new transition alumina before immersing in water prepared by lithiation of chi-alumina.

FIG. 3 illustrates the X-ray diffraction pattern of new transition alumina before immersion in water prepared by lithiation of chi-alumina. The sample is unexposed to air or moisture by covering the sample with a 0.5 micron thick Mylar film in an Ar atmosphere before it was removed from the glove box.

Figure 4:
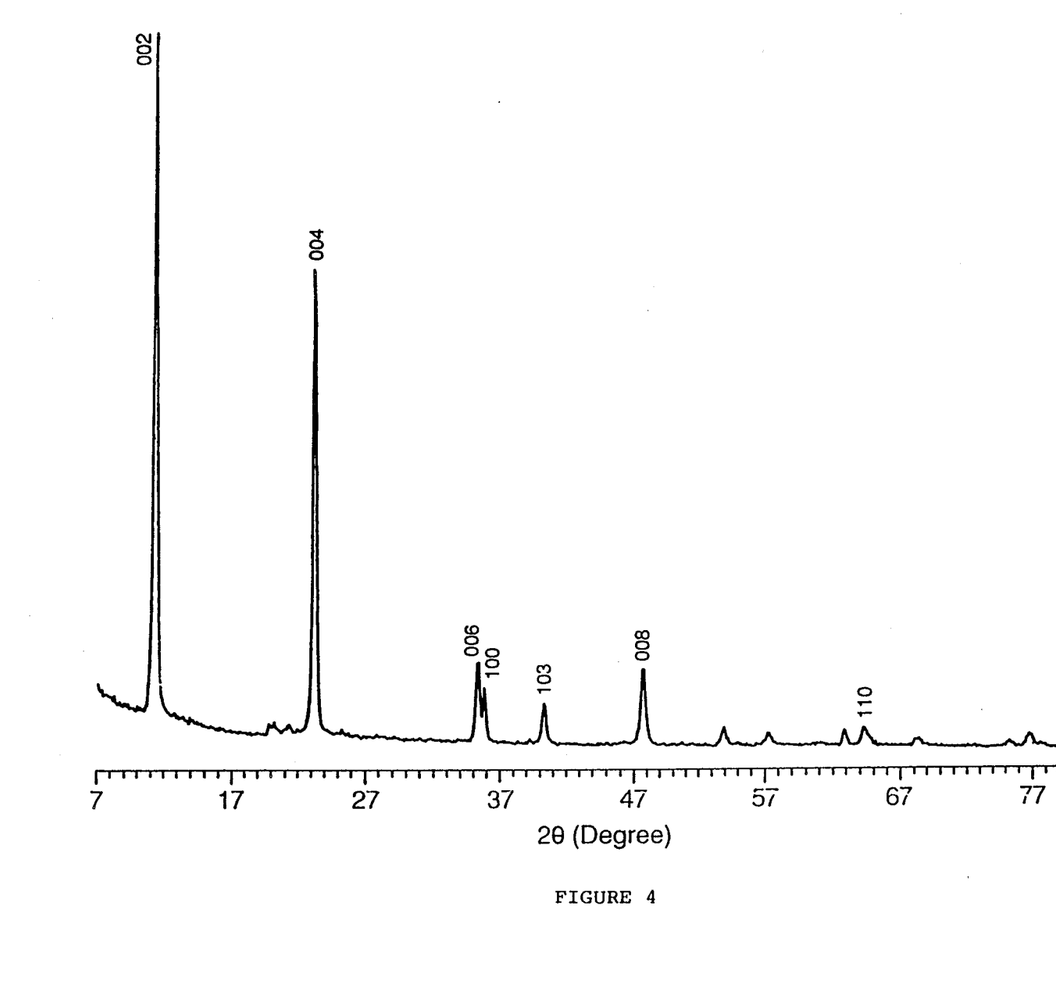
FIG. 4 illustrates an X-ray diffraction pattern of the new transition alumina fractured into ultra-fine particles.

FIG. 4 illustrates an X-ray pattern of the new transition alumina fractured into ultra-fine particles. The change in crystal structure between FIGS. 1 and 4 and also 2 and 5 show that the form of the alumina has changed. We have studied X-ray patterns from alpha, gamma and chi-alumina and none of these standard forms show the spectrum of FIG. 4. Because of this and because of the particle shape we believe this to be a new structure of alumina.

FIG. 5 shows how the new transition alumina particles are fractured, in this case using the procedure of Example 3.

FIG. 6 shows an enlarged view of the new transition $Al_2O_3$ fractured, using the procedure of Example 3. The SEM results suggest that the thickness of the platelets may be larger, perhaps in the order of 200 Angstroms, but the SEM photographs may be misleading because of charging of the alumina. Also, 100 Angstroms of gold was evaporated on the samples before the SEM pictures were taken to help remove electrostatic charges. This may account in part for the excess thickness. The low amount of deposited gold may account for the fact that all areas are not completely in electrical contact with other areas, this leading to charging.

Figure 7:
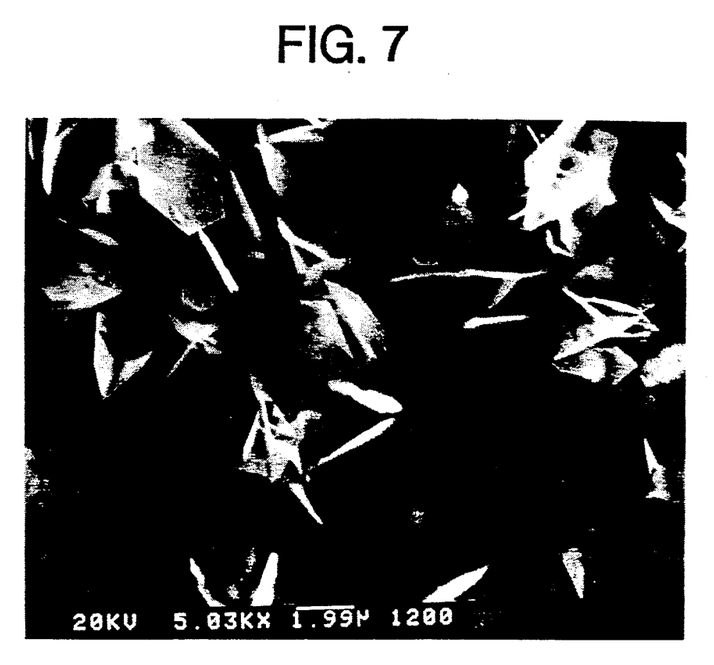
FIG. 7 illustrates a photomicrograph (SEM) of one of the platelets through which the underneath platelet is visible.

FIG. 7 illustrates one of the platelets through which the underneath platelet is visible. Since the secondary electrons used in SEM have energies of 40 to 50 electron volts, and have passed through the top platelet to make the bottom platelet visible, the thickness is estimated to be equal to go less than 50 Angstroms.

We believe that the diffusion of lithium into the pores of porous alumina should be quite general if a source of lithium metal (lithium in the zero-valent state) is provided. This technique should provide a general method of breaking up porous $Al_2O_3$. We expect that other alkali metals or alkaline earth metals will also break up alumina if they are small enough to enter the pores of the alumina.

Method of Obtaining the new Ultra-fine Alumina

Normally, ultra-fine alumina is obtained by a very costly technique starting with the precipitation of aluminum ions from solution. To our knowledge this is the first method of preparing and fracturing alumina particles to particles finer than about 1 micrometer. With our invention, the technique is simple and (especially using molten lithium for lithiation) relatively low cost.

Figure 8:
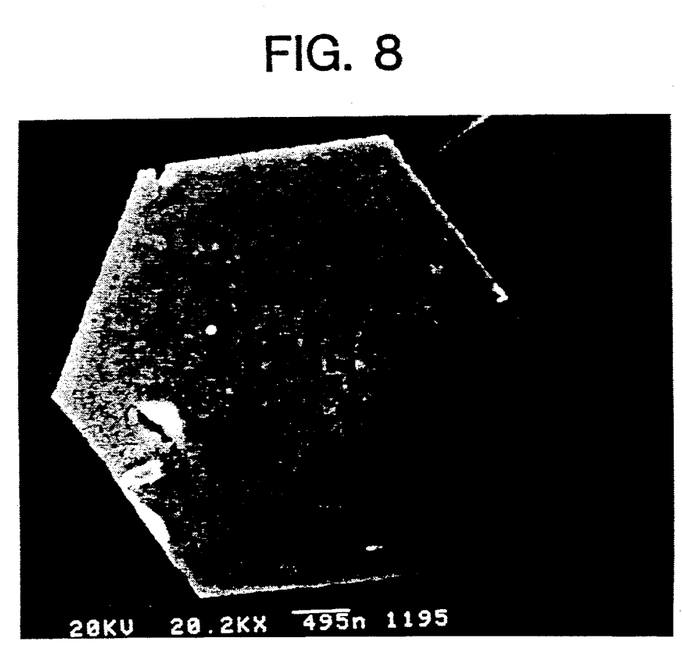
FIG. 8 illustrates a photomicrograph (SEM) of the platelets indicating that the shape of the platelet does not change when heated to 1100 deg. C. for 32 hours.

Another promising feature of our technique is the unique platelet particle shape. The platelet form has been found to provide a very smooth surface compared to the symmetric alumina particle shapes normally obtained. The platelet shape is ideal, for example, for providing a smooth finishing coat on a ceramic. Our alumina platelets do not scratch silicon when used as a "grinding grit". (Obviously, therefore it would not be used as a grinding grit. However, the example of silicon is made because ultra-smooth silicon is available for sensitive testing). The particulate $Al_2O_3$ obtained by the method of our invention is so smooth it acts as a lubricant and may find use as an ultra-high temperature lubricant. With its smooth and lubricating character it may for example find use as a coating to line the cylinder and piston of a ceramic engine. We have determined that heating the platelets to 1100° C. for 32 hours does not change the shape of the particles FIG. 8. The heating process causes the particles to sinter at above temperature, and upon immersion and ultrasonication in $H_2O$, the sintered particles break to yet smaller size particles.

EXAMPLE 1

A. Normal Lithiation of $Al_2O_3$

1. About 2 grams of porous $Al_2O_3$ was weighed and transferred to a jar of 100–150 cc volume. The jar had a screw-on cap in order to be sealed properly.
2. The jar with $Al_2O_3$ was then transferred to a glove box under Argon atmosphere.
3. About 10 cc of n-butyllithium (n-B Li) dissolved in hexane was poured onto the $Al_2O_3$. Sufficient n-BLi was poured so that it topped up the $Al_2O_3$ powder by about a few millimeters.
4. The cap was closed and the jar was shaken for about a minute.
5. The jar was left untouched for about 48 hours in the glove box.
6. After 48 hours, the n-BLi was slowly decanted.
7. About 20 cc of Hexane was then poured and the jar was shaken for one minute. Once all $Al_2O_3$ particles had settled, the hexane was decanted and the process was repeated with the same hexane wash for a second time.
8. The hexane was decanted and the jar and $Al_2O_3$ under Ar atmosphere was left in order to evaporate hexane thereby drying the $Al_2O_3$.
9. Once the $Al_2O_3$ powder had dried, the $Al_2O_3$ powder was scraped off the walls of the jar.
10. The cap was closed and the jar was transferred outside the glove box.
11. The cap was opened and about 100 cc of deionized distilled water was immediately poured onto the $Al_2O_3$ powder. The cap was then closed and the jar shaken vigorously with the cap closed. Upon opening the cap slightly, one could detect the $H_2$ gas escaping.
12. An ultrasonicater was used for about 5 to 10 minutes to further shake and break up the $Al_2O_3$ particles.
13. The sample was then left untouched for a few hours in order to permit the $Al_2O_3$ particles to settle.
14. The water was then decanted and with the addition of fresh water and shaking as before, the sample was again left untouched for a few hours.
15. Step 14 was repeated another time. The sample was dried at about 70° C. for a few hours. The sample was now ready for test measurements.

EXAMPLE 2

B. Ultrasonic Lithiation

1. Steps 1 to 4 of Method A were followed.
2. With the cap closed and completely secure, the jar ($Al_2O_3$+n-B Li+Ar gas) was transferred to an ultrasonicator. The samples were subjected to ultrasonication for about 5 to 10 hours.
3. Every few hours, the ultrasonicator was stopped and the sample was inspected to see if any part of the sample had settled. Any settled material was shaken so that the ultrasonication process could be continued.
4. After 10 hours, the jar was transferred to the glove box and steps 6 to 15 of Method A were followed.

EXAMPLE 3

C. Lithium Melt Diffusion Method

1. About 2 grams of a porous $Al_2O_3$ was transferred to a pyrex or quartz tube.
2. While the sample was evacuated with a pump at about $10^{-3}$–$10^{-5}$ torr pressure, the sample was heated to about 120° C. for about 2 hours.
3. Without exposing the sample to air, the sample was transferred to a glove box in Argon.
4. Pieces of Li metal in oil were cut to about 0.2 grams in weight. The pieces were washed with isopropyl alcohol a few times and then the clean shiny Li pieces were transferred to the pyrex tube holding the $Al_2O_3$.
5. The tube was closed and transferred to a vacuum pump while pumping. The neck of the tube was sealed with a torch.
6. The sealed tube was transferred to a furnace and the temperature slowly raised to about 600° C. over a period of about 8 hours.
7. The tube was left in the furnace for a further 16 hours.
8. The tube was quenched in cold $H_2O$.
9. The tube was transferred to the glove box. The seal was broken. The powder was collected and transferred into a jar with a screw cap.
10. Steps 10 to 15 of Method A were then followed.
11. Since the alumina suspension, prepared as above, contained different particle grades, extraction of different grades of alumina was conducted by sampling the flocculated particles each day for a two-week period and selecting the desired grade as the particles settled.

More rapid separation would probably be possible using a centrifuge.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

We claim:

1. A method of converting porous microscopic alumina particles into ultra-fine microscopic alumina particles, the method comprising:
   (a) introducing an alkali metal into the pores of porous microscopic alumina particles; and
   (b) immersing the alkali metal treated porous microscopic alumina particles in a water-containing liquid, thereby rapidly generating hydrogen in the pores of the porous microscopic alumina particles, and thereby fracturing the porous microscopic alumina particles into ultra-fine microscopic alumina particles.

2. The method as described in claim 1 wherein the alkali metal is lithium.

3. The method as described in claim 2 wherein the lithium is contained in a lithium organic vehicle.

4. The method as described in claim 3 wherein the lithium organic vehicle is n-butyllithium in hexane.

5. The method as described in claim 1 wherein the alkali metal is selected from the group consisting of lithium vapour and molten lithium.

6. The method as described in claim 1 including subjecting the alumina to vigorous agitation during the alkali metal introduction step.

7. The method as defined in claim 1 including subjecting the alumina to ultra-sonic agitation during the alkali metal introduction step.

8. The method as defined in claim 1 including immersing ultra-fine microscopic alumina particles in water.

9. The method as described in claim 1 wherein the water-containing liquid is water.

10. The method as described in claim 1 wherein the size of the microscopic alumina particles is in the range of about 1 to about 10 microns.

11. The method as described in claim 1 or 10 wherein the size of the ultra-fine microscopic alumina particles is in the range of about 1 to about 10 nanometers.

12. The method as defined in claim 1 wherein the ultra-fine microscopic alumina particles absorb a greater amount of $CO_2$ than the porous microscopic alumina particles.

* * * * *